US011638948B2

(12) United States Patent
Kotik et al.

(10) Patent No.: US 11,638,948 B2
(45) Date of Patent: May 2, 2023

(54) ELECTROCHEMICAL CELL HAVING WAVE CORNER SEALED JOINTS, AND DEVICE AND METHOD FOR FORMING SAME

(71) Applicant: Robert Bosch GmbH, Stuttgart (DE)

(72) Inventors: Mark Kotik, Rochester Hills, MI (US); Eugene Levin, Rochester Hills, MI (US); David Sarazin, Rochester Hills, MI (US)

(73) Assignees: Robert Bosch Battery Systems LLC, Orion, MI (US); Robert Bosch GmbH, Stuttgart (DE)

(*) Notice: Subject to any disclaimer, the term of this patent is extended or adjusted under 35 U.S.C. 154(b) by 865 days.

(21) Appl. No.: 16/332,408

(22) PCT Filed: Nov. 22, 2017

(86) PCT No.: PCT/EP2017/080020
§ 371 (c)(1),
(2) Date: Mar. 12, 2019

(87) PCT Pub. No.: WO2018/104051
PCT Pub. Date: Jun. 14, 2018

(65) Prior Publication Data
US 2021/0283671 A1    Sep. 16, 2021

Related U.S. Application Data

(60) Provisional application No. 62/430,511, filed on Dec. 6, 2016.

(51) Int. Cl.
*H01M 50/105* (2021.01)
*H01M 50/119* (2021.01)
(Continued)

(52) U.S. Cl.
CPC ........... *B21D 22/203* (2013.01); *B21D 51/52* (2013.01); *H01M 50/105* (2021.01);
(Continued)

(58) Field of Classification Search
CPC ...... B21D 22/203; B21D 51/52; B21D 51/16; B21D 22/20; H01M 50/124;
(Continued)

(56) References Cited

U.S. PATENT DOCUMENTS

| | | | |
|---|---|---|---|
| 2006/0210872 A1 | 9/2006 | Yageta et al. | |
| 2013/0101884 A1* | 4/2013 | Ueda .................. | H01M 50/543 429/127 |
| 2015/0333358 A1* | 11/2015 | Haraguchi .......... | H01M 10/045 429/162 |

FOREIGN PATENT DOCUMENTS

| | | | | |
|---|---|---|---|---|
| JP | H01-299717 | 12/1989 | | |
| WO | WO2012/140709 A1 * | 10/2012 | ........ | H01M 10/0436 |

OTHER PUBLICATIONS

Machine translation of WO2012/140709A1, Ueda Tomohiro (Year: 2012).*

(Continued)

*Primary Examiner* — Kwang Han
(74) *Attorney, Agent, or Firm* — Kelly McGlashen; Maginot, Moore & Beck LLP

(57) ABSTRACT

A forming device is configured to form metal laminated sheet material into a tray-shaped case half while allowing the material to form pleats in the corners of the recess during the forming process while preventing formation of pleats along the flange. The device forms the flange so that excess material in the corners of the case halves is arranged in an undulating shape. As a result, the flange has a waved or ruffled configuration at each corner. Two such case halves (Continued)

are sealed together along the flange to form a reliably sealed package. A method of forming pouch cell is also described.

5 Claims, 7 Drawing Sheets

(51) Int. Cl.
*H01M 50/121* (2021.01)
*H01M 50/124* (2021.01)
*H01M 50/126* (2021.01)
*H01M 50/133* (2021.01)
*H01M 50/136* (2021.01)
*B21D 22/20* (2006.01)
*B21D 51/52* (2006.01)

(52) U.S. Cl.
CPC ....... *H01M 50/119* (2021.01); *H01M 50/121* (2021.01); *H01M 50/124* (2021.01); *H01M 50/126* (2021.01); *H01M 50/133* (2021.01); *H01M 50/136* (2021.01)

(58) Field of Classification Search
CPC ............. H01M 50/119; H01M 50/105; H01M 50/121; H01M 50/126; H01M 50/133; H01M 50/136; Y02E 60/10
See application file for complete search history.

(56) References Cited

OTHER PUBLICATIONS

International Search Report for PCT application No. PCT/EP2017/080020.

* cited by examiner

ELECTROCHEMICAL CELL HAVING WAVE CORNER SEALED JOINTS, AND DEVICE AND METHOD FOR FORMING SAME

CROSS-REFERENCE TO RELATED APPLICATIONS

This application is a 35 U.S.C. § 371 National Stage Application of PCT/EP2017/080020, filed on Nov. 22, 2017, which claims the benefit of U.S. Provisional Application No. 62/430,511, filed on Dec. 6, 2016, the disclosures of which are herein incorporated by reference in their entirety.

BACKGROUND

Lithium-ion battery cells are provided in various cell types that address the space requirements of a very wide variety of installation situations, and the most common types used in automobiles are cylindrical cells, prismatic cells, and pouch cells. The cell types exhibit substantially the same internal construction, including an anode, a cathode, a separator membrane that separates the cathode space from the anode space, an electrolyte/solvent, and lithium source, but they can differ appreciably in terms of their general dimensions, cell housing, and volumetric energy efficiency.

With respect to the cell housing, for example, the cylindrical cells and prismatic cells each typically have a rigid housing, usually made of metal or plastic, whereas the pouch cell is surrounded only by a flexible outer envelope made of a metal laminated film material which seals off the actual battery space from the environment. Pouch cells may be formed using a drawing process which produces tray-like case halves that are subsequently sealed together to form a pouch cell housing. For example, in some conventional pouch cell housings formed of an aluminium laminated film, two identical laminated film sheets each are formed in a drawing process to include a central recess drawn to a depth of approximately 6 mm to 8 mm, and a planar flange that surrounds the central recess. To assemble a pouch cell using the drawn sheets, the active material and separator that form the electrode are disposed in the recesses in such a way as to be sandwiched between the sheets, and the flanges of the sheets are welded together around the circumference the central recess with a heating element to form a conventional (drawn) pouch cell.

However, the maximum draw depth of the metal laminated film used to form the pouch cell is limited by the material properties of the metal layer of the metal laminated film, whereby each case half has a limited depth due to drawing limits of the metal laminated film. For example, some aluminum laminated film materials have a maximum draw depth of about 6 mm to 8 mm, and drawing to greater depths can result in tearing of the aluminum layer in the corners of the case half due to material overstress and stretching in this region. The forming process including the drawing step thus limits the overall height of the pouch cell that can be formed to about 10 mm to 16 mm, where a cell height h of 16 mm is obtained by sandwiching the active material between two drawn films, where the cell height h corresponds to the draw direction of the material used to form the pouch. This height limit in turn limits the amount of active material that can be stored within the pouch cell. Such conventional pouch cells having drawn cell housings are typically formed with plates having a large area (e.g., length and width dimensions) to achieve acceptable energy outputs. That is, the aspect ratio of cell height to length or width is very small (for example, less than 0.1). In order to form battery pouch cells having a greater power storage capacity, it is desirable to form pouch cells having a greater overall depth.

SUMMARY

In some aspects, a forming device is provided for manufacturing a shaped workpiece. The device includes a die block and a punch that, when pressed together, cooperate to provide the workpiece having a desired shape. The die block includes a die working surface, a die support surface that faces away from the die working surface, and a die peripheral edge that joins the die working surface to the die support surface. The die working surface has surface features that include a central recess having a polygonal shape that defines at least three die apexes, each die apex having a corner radius, and a die flange that extends between the central recess and the die peripheral edge. The die flange has at least one alternating die ridge and die channel that extends between the central recess and the die peripheral edge. The at least one alternating die ridge and die channel are disposed along the corner radius of each apex, and define a curvilinear profile when viewed in cross section. The punch includes a punch working surface that faces the die working surface, a punch support surface that faces away from the punch working surface, and a punch peripheral edge that joins the punch working surface to the punch support surface. The punch working surface includes surface features that are a negative of the surface features of the die working surface. The die block and the punch are movable between a first position in which the die block and the punch are spaced apart a first distance, and a second position in which the die block and the punch are spaced apart a second distance that is less than the first distance. The die block and the punch are configured so that when in the second position with the workpiece disposed between the die working surface and the punch working surface, the die block and the punch cooperate to provide the workpiece having a desired shape.

The forming device may include one or more of the following features: When the die block and punch are in the second position, the spacing between the surface features of the die block and the surface features of punch is greater in regions including the die apexes than in regions spaced apart from the die apexes. The surface features of the punch working surface include a central protrusion having the polygonal shape having at least three punch apexes, each punch apex having a corner radius, and a punch flange that extends between the central protrusion and the punch peripheral edge. The punch flange has at least one alternating punch ridge and punch channel that extends between the central protrusion and the punch peripheral edge. The at least one alternating punch ridge and punch channel is disposed along the corner radius of each apex and defines a curvilinear profile when viewed in cross section. The central recess of the die block includes a die end surface, and die sidewalls that surround the die end surface, each die sidewall connected to an adjacent die sidewall via one of the die apexes. The central protrusion of the punch includes a punch end surface and punch sidewalls that surround the punch end surface, each punch sidewall connected to an adjacent punch sidewall via one of the punch apexes. In addition, when the die block and punch are in the second position, the central protrusion of the punch is disposed within the central recess of the die block such that the punch end surface faces the die end surface and is spaced apart from the die end surface the second distance, the punch sidewalls face the die sidewalls and are spaced apart from the die sidewalls the second distance, and the corner radius of each punch apex is disposed in a corresponding one of the corner radius of each die apex, and is spaced apart from the corresponding one of the corner radius of each die apex a third distance. The second distance is less than the third distance. The die flange surrounds the central recess, the die flange has a linear profile in portions of the die flange disposed between adjacent apexes, the punch flange surrounds the central recess, and the punch flange has a linear profile in portions of the die flange disposed between adjacent apexes. The central recess has four sides, and each pair of adjacent sides is joined by one of the die apexes. The central recess includes an end surface that is generally parallel to the flange, and sides that are perpendicular to the flange and join the end surface to the flange.

In some aspects, a method of manufacturing a sealed package from two blanks of sheet material is provided. The method includes providing a die block comprising a die working surface, a die support surface that faces away from the die working surface, and a die peripheral edge that joins the die working surface to the die support surface. The die working surface includes surface features that include a central recess and a die flange. The central recess has a polygonal shape that defines at least three die apexes, each die apex having a corner radius. The die flange extends between the central recess and the die peripheral edge. The die flange has at least one alternating die ridge and die channel that extends between the central recess and the die peripheral edge. The at least one alternating die ridge and die channel is disposed along the corner radius of each apex and defines a curvilinear profile when viewed in cross section.

The method may include providing a punch that is a negative of the die block.

The method may include inserting a first material sheet between the die block and the punch.

The method may include pressing the punch into the die block in a forming process such that the first material sheet is formed into a first case half having a first central recess surrounded by a first flange, and first waves defined by the alternating die ridges and die channels formed in the first flange at locations corresponding to apexes of the first central recess.

The method may include removing the first case half from the die block and punch.

The method may include inserting a second material sheet between the die block and the punch.

The method may include pressing the punch into the die block in a forming process such that the second material sheet is formed into a second case half having a second central recess surrounded by a second flange, and second waves defined by the alternating die ridges and die channels formed in the second flange at locations corresponding to apexes of the second central recess.

The method may include removing the second case half from the die block and punch.

The method may include assembling the first case half and second case half together such that punch facing surfaces of the first flange and the second flange contact each other and the first waves are nested within the second waves.

The method may include joining the first case half flange to the second case half flange by forming a seal line between the first flange and the second flange about a circumference of the first and second central recesses. In some embodiments, forming a seal line includes applying heat to at least one of the first and second flanges.

The method may include the step of pressing the punch that comprises moving the punch relative to the die block from a first position in which the flange of the punch is spaced apart from the flange of the die block a first distance to a second position in which the flange of the punch is spaced apart from the flange of the die block a second distance. The first distance is sufficiently large to allow the material sheet to be inserted between the die block and the punch, and the second distance is less than the first distance.

The method may include the feature wherein when a flange of the punch is spaced apart from the flange of the die block the second distance, the die apex is spaced apart from an apex of the punch a third distance, where the third distance is greater than the second distance.

In some aspects, a battery cell is provided. The battery cell includes a cell housing and an electrode assembly disposed in the cell housing. The cell housing includes a first sheet of flexible metal laminate film material bordered by a first peripheral edge having a polygonal shape that defines at least three apexes when seen in top plan view, and a second sheet of flexible metal laminate film material bordered by a second peripheral edge having the polygonal shape that defines at least three apexes when seen in top plan view. The second sheet is stacked with the first sheet, and the first sheet is joined to the second sheet along a seal line that extends along the respective peripheral edges and defines a path that is curvilinear in a plane that is parallel to the stacking direction of the first and second sheets.

The battery cell may include one or more of the following features: The first sheet includes a first central recess having a polygonal shape that defines at least three first apexes, each first apex having a corner radius, and a first flange that extends between the first central recess and the first sheet peripheral edge. The first flange has at least one alternating ridge and channel that extends between the first central recess and the first sheet peripheral edge. The at least one alternating ridge and channel is disposed along the corner radius of each first apex and defines a curvilinear profile when viewed in cross section. Similarly, the second sheet includes a second central recess having a polygonal shape that defines at least three second apexes, each second apex having a corner radius, and a second flange that extends between the second central recess and the second sheet peripheral edge. The second flange has at least one alternating ridge and channel that extends between the second central recess and the second sheet peripheral edge. The at least one alternating ridge and channel is disposed along the corner radius of each second apex and defines a curvilinear profile when viewed in cross section. The first sheet and the second sheet are formed of the same material, the material including an aluminium film layer that is sandwiched between polymer layers. The central recess of each of the first sheet and the second sheet is formed in a forming process to a depth of greater than 10 millimeters, and the flange is free of pleats. The first flange surrounds the first central recess, and the first flange has a linear profile in portions of the first flange disposed between adjacent first apexes. In addition, the second flange surrounds the second central recess, and the second flange has a linear profile in portions of the second flange disposed between adjacent second apexes. The first central recess includes a first end surface that is generally parallel to the first flange, and first sides that are perpendicular to the first flange and join the first end surface to the first flange. A depth of the first central recess is greater than the draw depth of the first sheet, where the depth of the first central recess corresponds to a distance between the first flange and the first end surface.

A robust pouch cell forming device and method are used to provide a battery cell having a pouch cell housing formed of an aluminum laminated film that is formed into a tray-shaped case-half without stretch and overstress in the corners of the case half. As a result, a pouch cell can be provided having a greater overall depth than a pouch cell formed by some conventional drawing methods. For example, an aluminum laminated film may be formed into a tray-shaped case-half having a depth that is greater than 10 mm to provide a pouch cell having a height of greater than 20 mm. In addition, the pouch cell is formed having a reliable seal joint between the case halves.

The device and method provide a forming process that is performed without stretch and overstress on the corners of the metal laminated film while providing a case half having a relatively deep recess that is surrounded by a flange. In particular, the apparatus and method form the metal laminated sheet material into a tray-shaped case half while allowing the material to form pleats in the corners of the recess during the forming process while preventing formation of pleats along the flange. The device and method forms the flange so that excess material in the corners of the case halves is arranged in an undulating shape. As a result, the flange has a waved or ruffled configuration at each corner. The formation of pleats within the recess at the corners of the recess are acceptable since no sealed joints are formed in this region. However, since the case halves are sealed to each other along the flange, formation of pleats in along the flange are undesirable since they would prevent a reliable seal and connection to be formed between the two case halves. By shaping the excess material which is found in the flange corners into undulations or waves, the excess material can be accommodated without it folding back on itself and a reliable sealed joint can be formed along the unpleated, undulating surface. In particular, the waved flange configuration allows for a reliable seal to be formed between the case halves even when the case half depth is relatively large, for example, 10 mm or greater.

DETAILED DESCRIPTION

Figure 1:
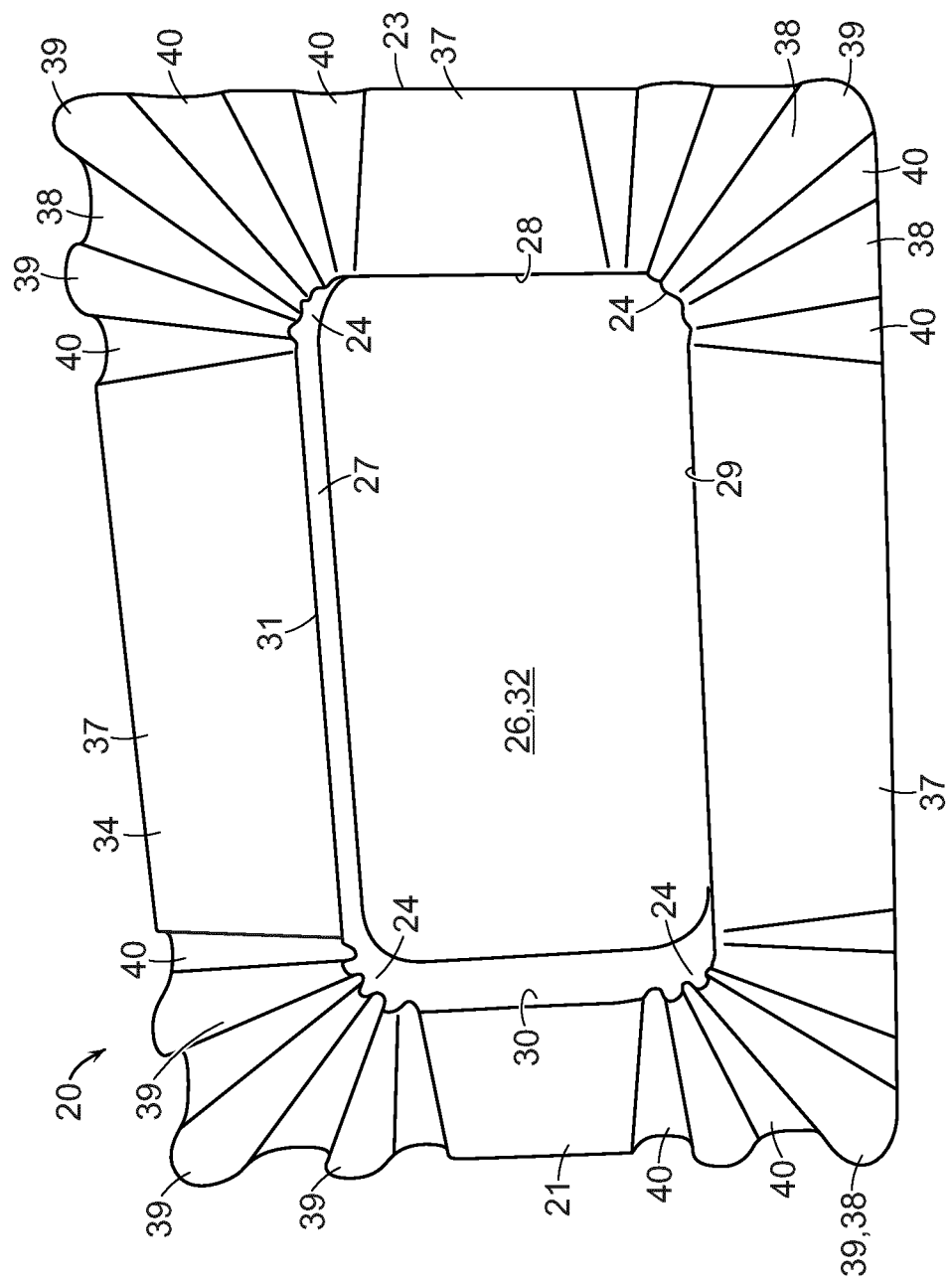
FIG. 1 is a perspective view of a punch that serves as element of a forming device.
Figure 2:
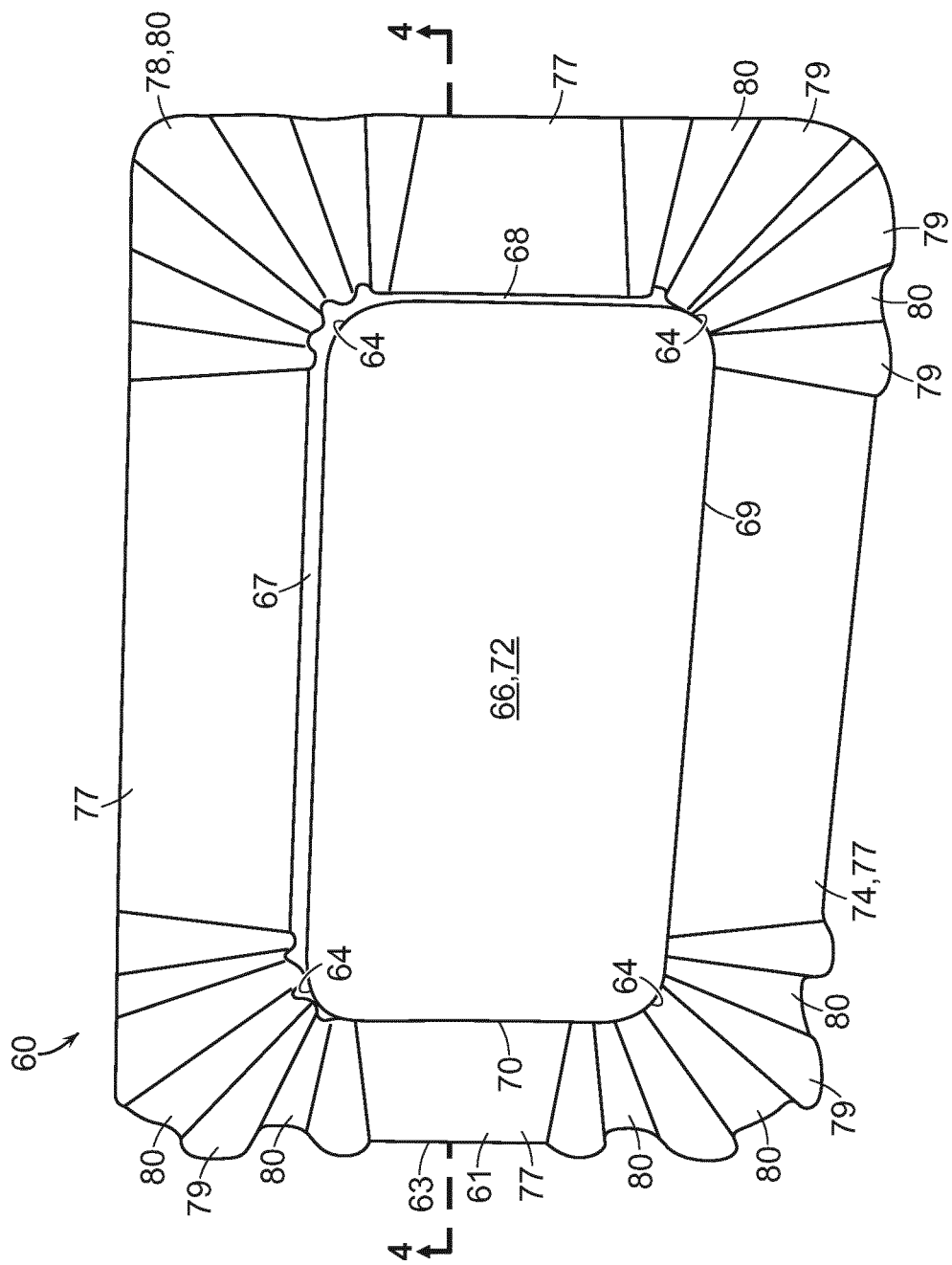
FIG. 2 is a perspective view of a die block that serves as another element of the forming device.
Figure 3:
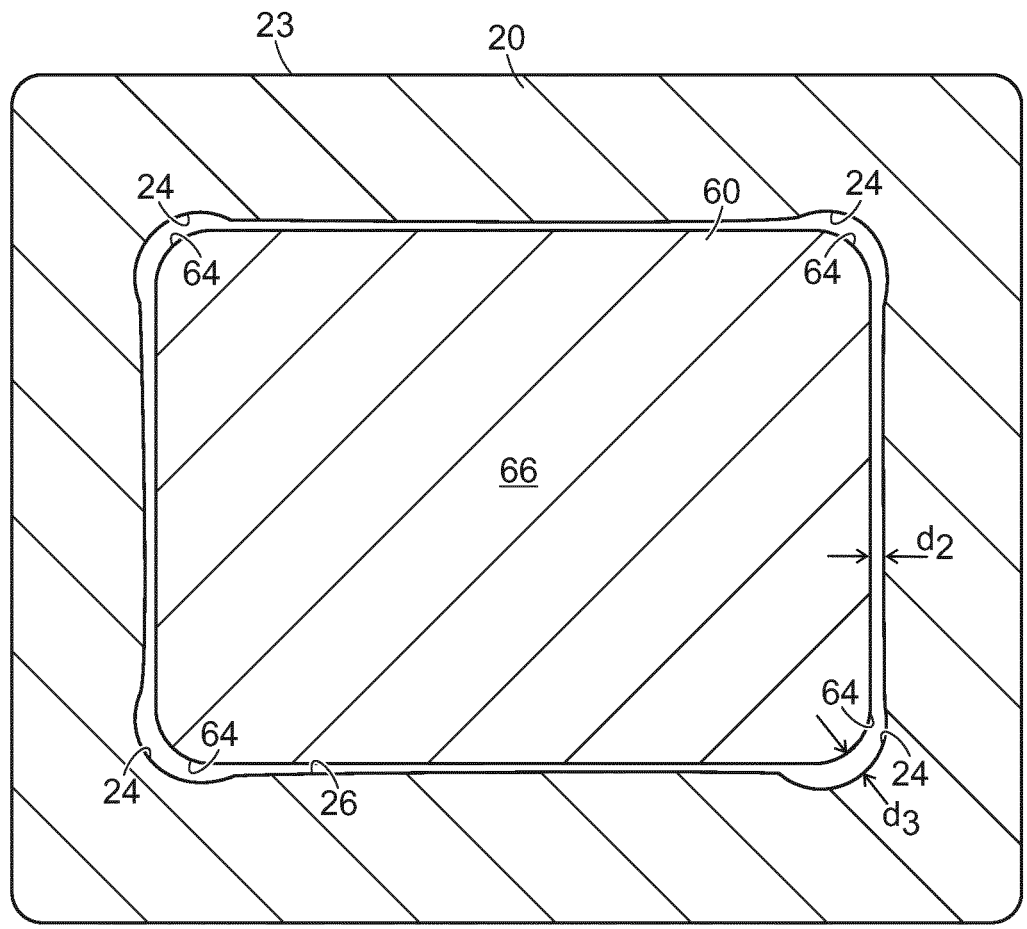
FIG. 3 is a cross-sectional view of the forming device as seen along line 3-3 of FIG. 4.
Figure 4:
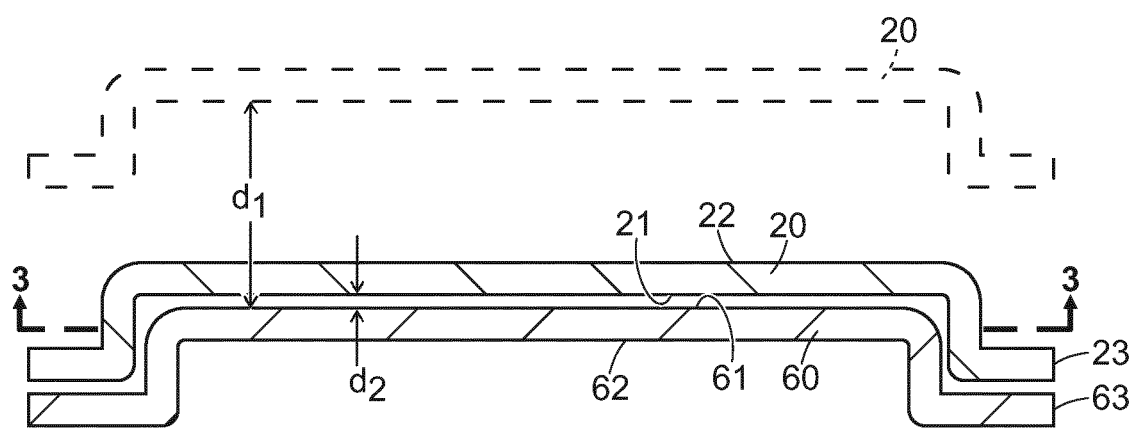
FIG. 4 is a cross-sectional view of the forming device as seen along line 4-4 of FIG. 2 illustrating the forming device in the first position (broken lines) and the second position (solid lines).
Figure 5:
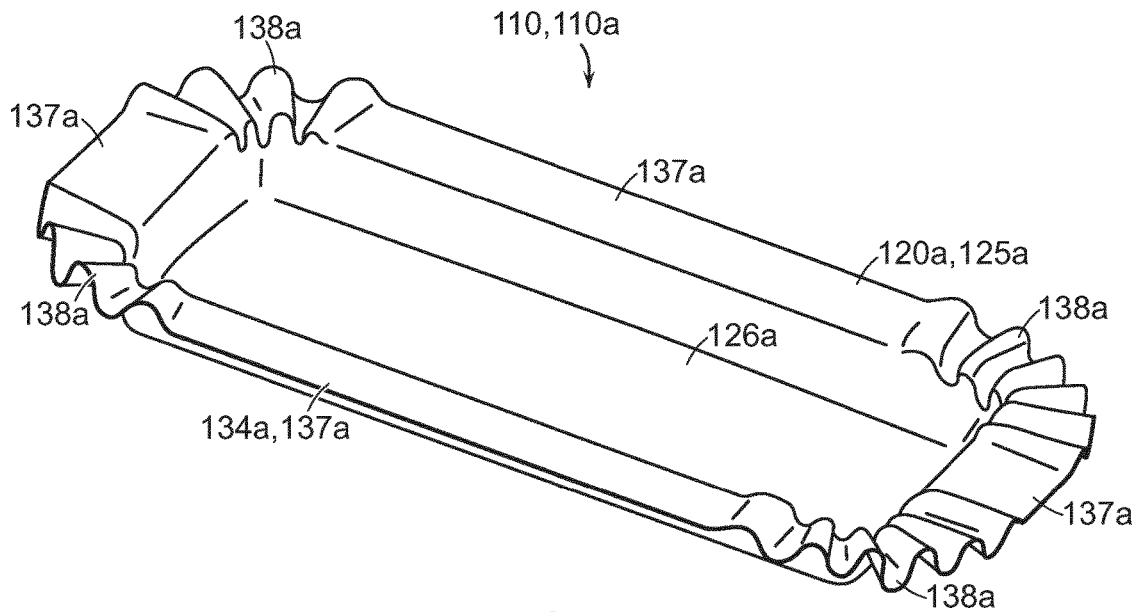
FIG. 5 is a top perspective view of a case half.
Figure 6:
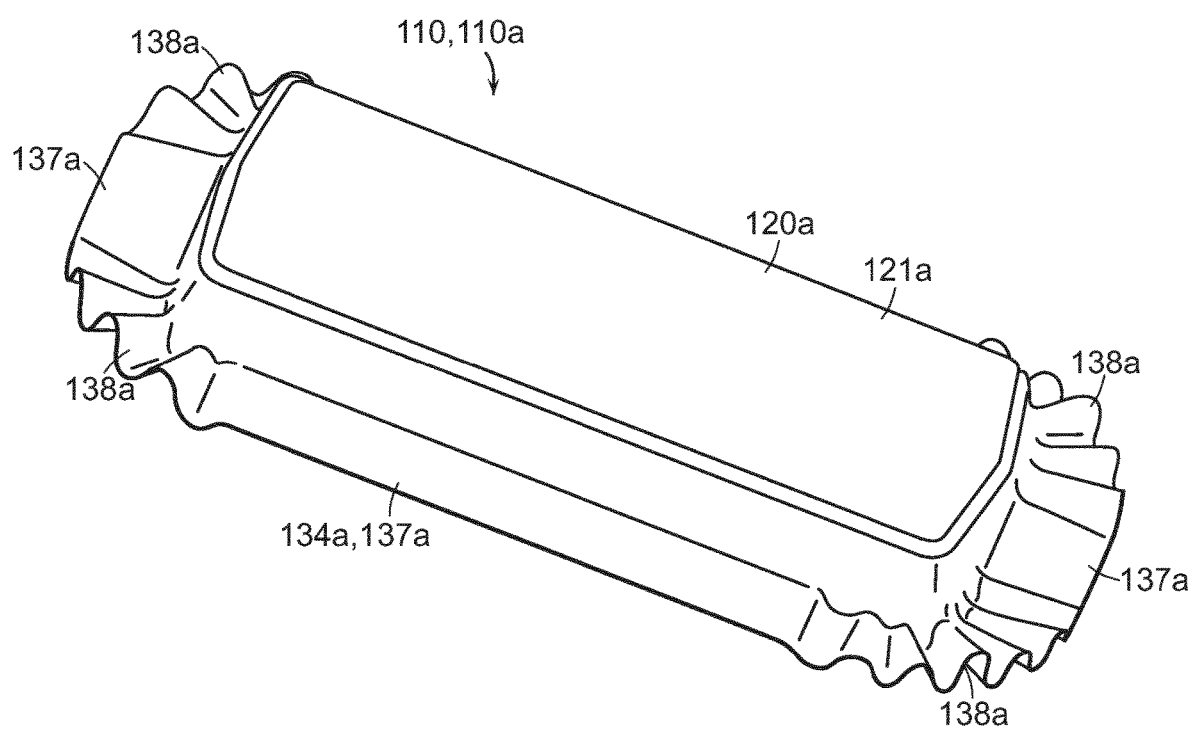
FIG. 6 is a bottom perspective view of a case half.

Referring to FIGS. 1-6, a forming device 10 is used to shape a workpiece, for example a material sheet 120, into a pouch cell half case 110a that can be joined together with another half case to form a pouch cell housing 102 for a battery cell 100. The forming device 10 includes a punch 60 that performs a pressing operation on the material sheet 120, and a die block 20 that securely clamps the material sheet 120 and cooperates with the punch 60 during the pressing operation to form the half case 110a having a desired shape. The die block 20 and punch 60 are shaped so that each half case 110a formed therebetween is provided with features that ensure mutual alignment with a counterpart half case 110b and facilitate a secure sealed connection to the counterpart half case 110b, as discussed in detail below. A method of manufacturing a sealed package, such as a flexible, metal foil laminate battery cell housing 102, from two portions of sheet material is described in detail below. In addition, a battery cell 100 formed by such a method is also described in detail below.

The die block 20 is a metal block that includes a die working surface 21, a die support surface 22 that faces away from the die working surface 21, and a die peripheral edge 23 that joins the die working surface 21 to the die support surface 22. The die working surface 21 is formed having surface features that help define the shape of the workpiece that is formed within the forming device 10. The die working surface 21 includes a central recess 26 that is surrounded by, and spaced apart from, the die peripheral edge 23. The central recess 26 has a polygonal shape. In the illustrated embodiment, the central recess 26 has the shape of a right rectangle, but is not limited to this shape. Thus, the central recess 26 has a first die sidewall 27, a second die sidewall 28 joined at one end to the first die sidewall 27, a third die sidewall 29 that is parallel to the first die sidewall 27 and joined to the second die sidewall 28, and a fourth die sidewall 30 that is parallel to the second die sidewall 28 and is joined to the first and third die sidewalls 27, 29. Die apexes 24 are formed at the intersections of the four sidewalls 27, 28, 29, 30, and each die apex 24 has a corner radius. The central recess 26 includes a closed end 32 at one end of the four sidewalls 27, 28, 29, 30.

The die working surface 21 includes a die flange 34 that surrounds an open end 31 of the four sidewalls 27, 28, 29, 30. The die flange 34 extends between the central recess 26 and the die peripheral edge 23, and is generally parallel to, and offset from, the central recess closed end 32. The die flange 34 has generally planar portions that extend between adjacent die apexes 24. In addition, the die flange 34 has waved portions 38 disposed at each die apex 24. Each waved portion 38 includes alternating die ridges 39 and die channels 40 that extend between the central recess 26 and the die peripheral edge 23. The transitions between the die ridges 39 and the die channels 40 are smoothly curved so that each waved portion 38 defines an undulating, curvilinear profile when viewed in cross section. In addition, the die ridges 39 and die channels 40 have a smaller amplitude and wavelength at the central recess 26 than at the die peripheral edge 23.

The punch 60 is a metal block that includes a punch working surface 61 that faces toward the die working surface 21, a punch support surface 62 that faces away from the punch working surface 61, and a punch peripheral edge 63 that joins the punch working surface 61 to the punch support surface 62. The punch working surface 61 is formed having surface features that, in cooperation with the features of the die working surface 21, help define the shape of the workpiece that is formed within the forming device 10.

The punch working surface 61 includes a central protrusion 66 that is surrounded by and spaced apart from the punch peripheral edge 63. The central protrusion 66 has a shape that corresponds to the shape of the die central recess 26. In the illustrated embodiment, the central protrusion 66 has the shape of a right rectangle, and includes a first punch sidewall 67, a second punch sidewall 68 joined at one end to the first punch sidewall 67, a third punch sidewall 69 that is joined at one end to the second punch sidewall 68 and is parallel to the first punch sidewall 67, and a fourth punch sidewall 70 that is joined to both the first and third punch sidewalls 67, 69 and is parallel to the second punch sidewall 68. Punch apexes 64 are formed at the intersections of the four sidewalls 67, 68, 69, 70, and each punch apex 64 has a corner radius. The central protrusion 66 includes a closed end 72 at one end of the four sidewalls 67, 68, 69, 70.

The punch working surface 61 includes a punch flange 74 that surrounds an open end 71 of the four punch sidewalls 67, 68, 69, 70. The punch flange 74 extends between the central protrusion 66 and the punch peripheral edge 63, and is generally parallel to, and offset from, the central protrusion closed end 72. The punch flange 74 has generally planar portions that extend between adjacent punch apexes 64. In addition, the punch flange 74 has waved portions 78 disposed at each punch apex 64. Each waved portion 78 includes alternating punch ridges 79 and punch channels 80 that extend between the central protrusion 66 and the punch peripheral edge 63. The transitions between the punch ridges 79 and the punch channels 80 are smoothly curved so that each waved portion 78 defines an undulating, curvilinear profile when viewed in cross section. In addition, the punch ridges 79 and punch channels 80 have a smaller amplitude and wavelength at the central protrusion 66 than at the punch peripheral edge 63.

The surface features (i.e., the central protrusion 66 and the punch flange 74 including the planar portions 77 and the waved portions 78) of the punch working surface 61 have a shapes that are a negative of the shapes of the surface features (i.e., the central recess 27 and the die flange 34 including the planar portions 37 and the waved portions 38) of the die working surface 21. However, in order to accommodate the thickness of a workpiece that is pressed between the die and punch working surfaces 21, 61, the sizes of the surface features of the punch working surface 61 are slightly less than the sizes of the surface features of the die working surface 21, as discussed further below.

In use, the support surfaces 22, 62 of the die block 20 and the punch 60 are each securely fixed within a press (not shown) that moves the punch 60 relative to the die block 20 in order to perform a pressing operation. For example, the die block 20 and the punch 60 are movable between a first, retracted position and a second, advanced position.

In the first position, the die block 20 and the punch 60 are spaced apart a first distance d1 that is at least sufficient to permit a planar workpiece to be inserted between the die block working surface 21 and the punch working surface 61.

In the second position, the die block 20 and the punch 60 are moved closer together, for example by pressing the punch 60 into the die block 20 so that the surface features of the punch 60 are nested within the surface features of the die block 20. More specifically, in the second position, the punch central protrusion 66 is disposed within the die block central recess 26 such that the punch end surface 72 faces the die end surface 32 and is spaced apart from the die end surface 32 a distance d2. In the second position, the punch sidewalls 67, 68, 69, 70 face the die sidewalls 27, 28, 29, 30 and are spaced apart from the die sidewalls a distance d2. In the second position, the planar portions 37 and the waved portions of the punch flange 74 face the corresponding planar portions 37 and waved portions 38 of the die flange 34 and are spaced apart from the corresponding planar portions 37 and waved portions 38 of the die flange 34 a distance d2. In addition, in the second position, the corner radius 65 of each punch apex 64 is disposed in a corner radius 25 of a corresponding die apex 24, and is spaced apart from the corresponding corner radius 25 of each die apex 24 a distance d3, where the distance d2 is less than the distance d3.

Thus, when the die block 20 and punch 60 are in the second position, the spacing between the surface features of the die block and the surface features of punch (e.g., the tooling gap) is greater in regions including the apexes than in regions spaced apart from the apexes. The greater spacing at the apexes 24, 64 accommodates pleating of excess workpiece material that gathers at the apexes during forming, and allows the pleating to occur between facing apexes 24, 64 of the die block 20 and punch 60 without damaging stretch and overstress of the workpiece material. It should be noted that minimal excess spacing is provided between the waved portions 38 of the die flange 34 and the waved portion 78 of the punch flange 74, since pleating is undesirable in the flange of the workpiece. Instead, the undulations of the waved portions 38, 78 accommodate the excess material by training it over a longer path corresponding to the curved surfaces of the alternating ridges 39, 79 and channels 40, 80.

The second distance d2 is sufficiently small that when the workpiece is disposed between the die working surface 21 and the punch working surface 61, and the die block 20 and the punch 60 are in the second, advanced position, the die block 20 and the punch 60 cooperate to provide the workpiece in the desired shape. In some embodiments, the distance d2 is related to the thickness of the workpiece in that the distance d2 is slightly greater the thickness of the workpiece. For example, if the sheet material used to provide the workpiece is an aluminium foil laminate having a thickness of about 0.15 mm, the distance d2 is about 0.2 mm. In the same example, the distance d3 may be in a range of 0.4 mm to 1.0 mm, or alternatively in a range of 0.5 to 0.7 mm. In the illustrated embodiment, the distance d3 is about 6 mm.

Figure 7:
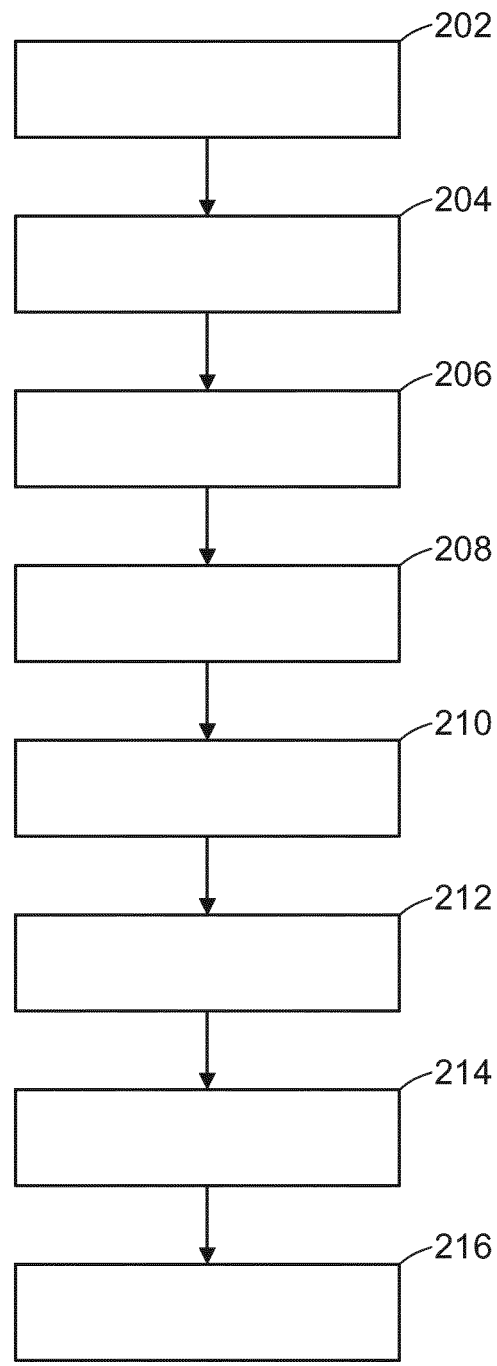
FIG. 7 is a flow chart illustrating a method of manufacturing a sealed package from two portions of sheet material.
Figure 8:
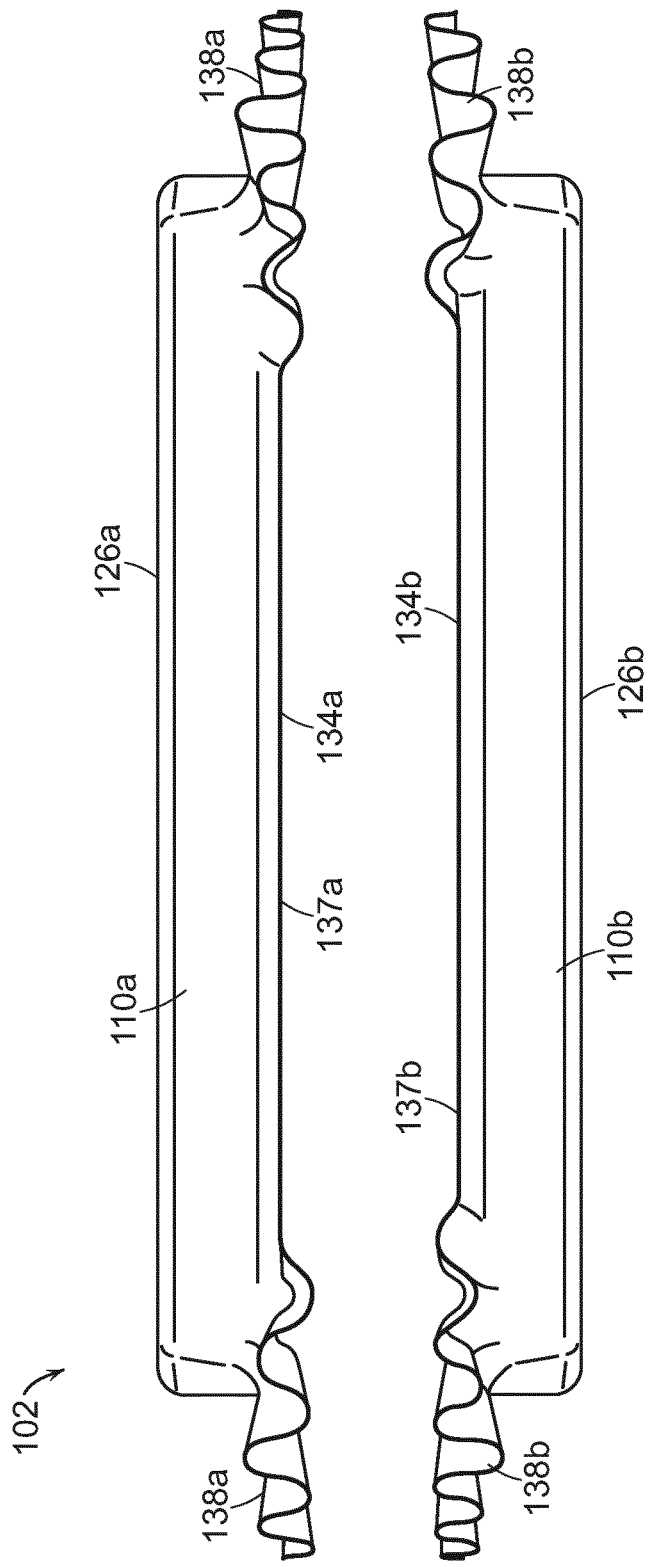
FIG. 8 is an exploded view of a cell housing including two case halves.
Figure 9:
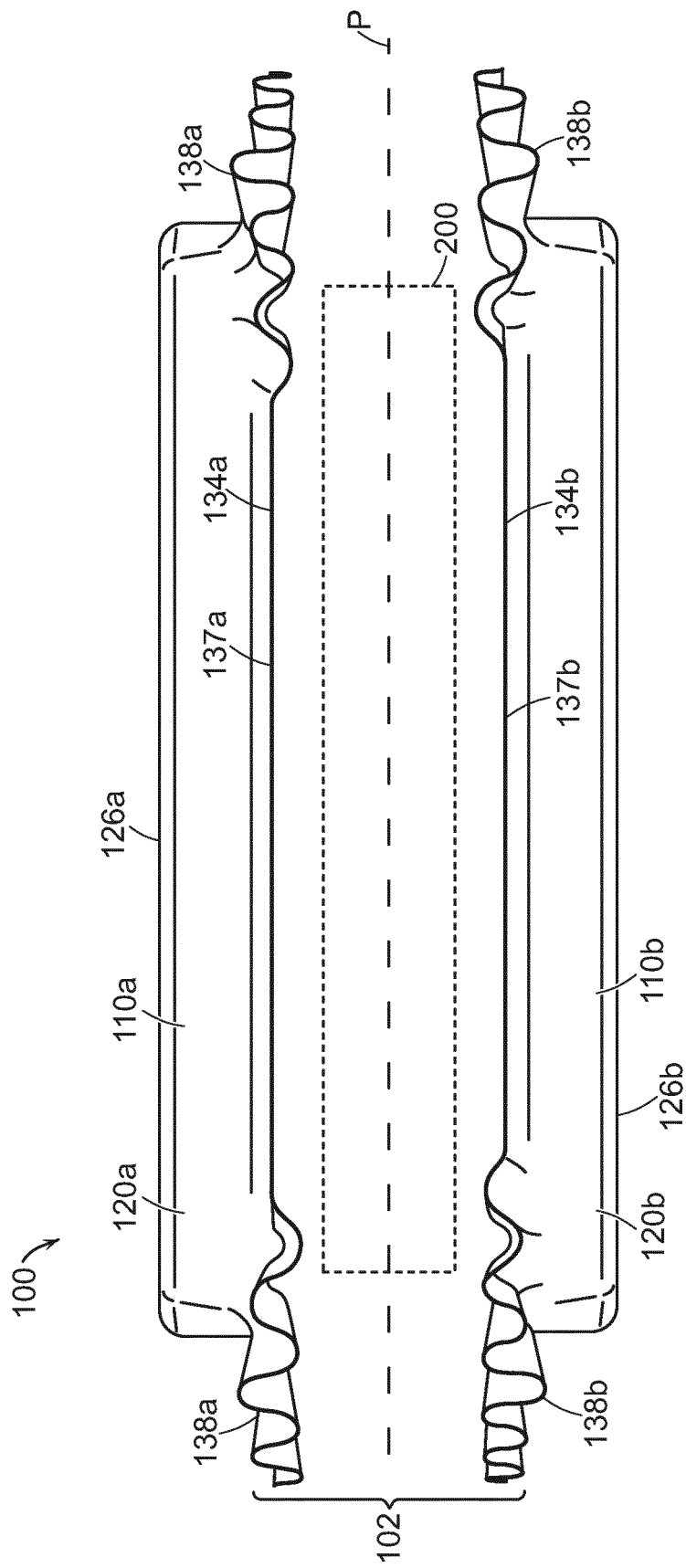
FIG. 9 is an exploded view of a cell formed of the case halves and including an electrode assembly (shown schematically in broken lines) disposed in the cell housing.

Referring to FIG. 7, a method of manufacturing a sealed package from two portions of sheet material will now be described.

In an initial step, the forming device 10 is provided, including the die block 20 and the punch 60 as described above with respect to FIGS. 1 and 2 (step 200). The forming device 10 is positioned in the first, retracted position in which the die block 20 and the punch 60 are spaced apart the first distance d1 that is at least sufficient to permit a planar workpiece to be inserted between the die block working surface 21 and the punch working surface 61.

When the forming device 10 is in the first position, the workpiece is inserted between the die block 20 and the punch 60 (step 202). In the illustrated embodiment, the workpiece is a first material sheet. In some embodiments, the first material sheet is a rectangular sheet of a flexible, metal foil laminate material. In applications where the first material sheet is formed of a metal foil that is sandwiched between a polypropylene layer and a polyethylene layer, the polypropylene layer is arranged to face the punch working surface 61, and the polyethylene layer is arranged to face the die working surface 21.

After the first material sheet is inserted between the die block 20 and the punch 60, the forming device 10 is moved from the first, retracted position to the second, advanced position (step 204). In particular, the punch 60 is pressed into the die block 20 in a forming process such that a first case half 110a is formed. For example, the first case half 110a includes a first rectangular recess 126a, a first flange 134a that surrounds the first recess 126a. The first flange 134a includes waved portions 138a at locations corresponding to corners of the first recess 126a, and planar portions 137a that extend between the waved portions 138a.

Next, the forming device 10 is moved from the second, advanced position to the first, retracted position, and the first case half 110a is removed from the forming device 10 (step 206).

Steps 200-206 illustrate how a first case half 110a is formed using the pair of forming elements including the die block 20 and the punch 60. In order to provide a second case half 110b that is configured to mate with the first case half 110, it is necessary to use a second set of pair of forming elements in the forming device 10. The second pair of forming elements include a counterpart die block (not shown) and a counterpart punch (not shown), where the counterpart die block working surface is a mirror image of the working surface 21 of the die block 20 and the counterpart punch working surface is a mirror image of the working surface 61 of the punch 60. The steps for forming the second case half 110b are described below with respect to steps 208-212:

With the forming device 10 in the first, retracted position, a second material sheet is inserted between the counterpart die block and the counterpart punch (step 208). In some applications, the second material sheet is the same shape, size and material as the first material sheet. In applications where the second material sheet is formed of a metal foil that is sandwiched between a polypropylene layer and a polyethylene layer, the polyethylene layer is arranged to face the punch working surface 61, and the polypropylene layer is arranged to face the die working surface 21.

After the second material sheet is inserted between the counterpart die block and the counterpart punch 60, the forming device 10 is moved from the first, retracted position to the second, advanced position (step 210). In particular, the counterpart punch is pressed into the counterpart die block in a forming process such that a second case half 110b is formed. For example, the second case half 110b is a mirror image of the first case half 110a, and includes a second rectangular recess 126b, a second flange 134b that surrounds the second recess 126b. The second flange 134b includes waved portions 138b at locations corresponding to corners of the recess 126b, and planar portions 137b that extend between the waved portions 138b.

Next, the forming device 10 is moved from the second, advanced position to the first, retracted position, and the second case half 110b is removed from the forming device 10 (step 212).

Once the first case half 110a and the second case half 110b have been formed, the package is assembled. This includes assembling the first case half 110a and the second case half 110b together with the respective recesses 126a, 126b opened facing each other and with the product to be enclosed disposed in the space defined by the first and second recesses 126a, 126b. In addition, the respective first and second flanges 134a, 134b are aligned and the waved portions 137a of the first case half 110a nest with the waved portions 137b of the second case half 110b (step 214).

After the package is assembled, the first case half flange 134a is joined to the second case half flange 134b by forming a seal line about a circumference of the recessed portions 127a, 127b (step 216). The seal line is formed by applying heat to the first and second flanges, for example by using a heat sealing device, welding, or other appropriate joining technique. In the regions corresponding to the waved portions, the seal line defines a curvilinear path along the waves.

In some embodiments excess flange material (e.g., flange material disposed between the seal line and the case half peripheral edge) may be trimmed off. In addition, or alternatively, the flange may then be folded so as to closely overlie the sidewalls of the recessed portion 127.

In some embodiments, the method is used to form case halves 110a, 110b of a pouch cell housing 102. Each case half 110a, 110b is a sheet of a flexible, metal laminated film material that has been formed within the forming device 10 to have the above-described shape that includes a central recess 126a, 126b that is surrounded by a flange 134a, 134b, where the flange 134a, 134b includes waved portions 138a, 138b at each apex of the central recess 126a, 126b. To provide a cell 100, two case halves 110a, 110b are assembled together with the active material and separator that form the electrode assembly 200 (the electrode assembly 200 is represented schematically using dashed lines) disposed in the central recesses 126a, 126b along with an electrolyte in such a way as to be sandwiched between the case halves 110a, 110b. In addition, the flange 134a of one of the case halves 110a is layered with the flange 134b of the other case half 110b, and the flanges 134a, 134b are welded together around the circumference the central recesses 126a, 126b with a heating element to form a sealed pouch cell 100. The heat sealing process results in a seal line that defines a path that is curvilinear and travels through a plane P that is parallel to the flange planar portions 137a, 137b. Due to the undulating configuration of the waved portions of the flange, the flange is free of folds or pleats, and the seal line forms a reliable seal joint between the assembled case halves 110a, 110b. As used herein, the terms "fold" and/or "pleat" refer to a configuration in which the material layer is folded back on itself so that one portion of the material layer overlies another portion of the material layer.

In some embodiments, each of case halves 110a, 110b used to form the pouch cell housing 102 has a central recess depth that is greater than the draw depth of the metal laminated film material, where the depth of the central recess corresponds to a distance between the flange and the recess end surface. As a result, the pouch cell housing 102 has a cell height that is greater than the cell height of some conventional drawn pouch cells.

In order to add a liquid electrolyte to the pouch cell housing 102, the circumferentially extending seal line may be formed having a small gap, for example a gap of about 5 mm to 10 mm. The gap allows electrolyte to be injected into the pouch cell housing 102, and may also be used in a vacuuming operation to remove gas from the pouch cell housing. Upon completion of these operations, the gap is sealed.

In some embodiments, one case half 110a is formed from a first sheet of a first material, and the counterpart case half 110b is formed of a second sheet of a second material, and the first material is the same as the second material. For example, the first and second sheets may be formed of metal laminated film material that includes an aluminium film layer that is sandwiched between polymer layers. In some embodiments, when an aluminum laminated film material is used to form the case halves 110a, 110b, the central recess of each of the first case half 110a and the second case half are formed in a forming process to a depth of greater than 10 mm, and the flange is free of folds or pleats.

The flexible metal laminated film is folded and welded to form the pouch cell housing. Although the material used in the illustrated embodiment to form a pouch cell is a flexible, three-layer, metal laminated film having a polypropylene layer, an aluminium foil layer, and a polyethylene layer, the material used to form the pouch cell may have a greater or fewer number of layers and/or use different materials to form the layers. In one example, some batteries that are used in cell phones employ a pouch cell housing that has the following three layers which are joined by a thin adhesive between adjacent layers: oriented nylon/aluminium foil/polypropylene. In another example, some batteries that are used in electric vehicles employ a pouch cell housing that has the following four layers which are joined by a thin adhesive between adjacent layers: polyethylene terephthalate/oriented nylon/aluminium foil/polypropylene.

In the illustrated embodiment, the method is used to form a pouch cell housing of a battery cell. It is understood, however, that the method may be used to form other products and/or packaging that requires a reliable seal, including, but not limited to, packaging for food.

In the method described herein, the forming device 10 employs two separate pairs of forming elements, where the first pair including the die block 20 and the punch 60 is used to form the first case half 110a, and the second pair including the counterpart die block and the counterpart punch is used to form the second case half 110b. It is understood, however, that only one pair of forming elements would be required if the die block 20 and the punch 60 were formed in such a way that half the respective working surface mirrored the other half of the same working surface across an axis of symmetry.

In the method described herein, two separate blanks of sheet material are used, and each blank is used to form a single case half that are subsequently assembled together. It is understood, however, that a single, larger blank of sheet material can be used to form two case halves, and that the two case halves can be assembled by folding the larger blank appropriately.

Selective illustrative embodiments of the apparatus and method are described above in some detail. It should be understood that only structures considered necessary for clarifying the apparatus and method have been described herein. Other conventional structures, and those of ancillary and auxiliary components of the apparatus and method, are assumed to be known and understood by those skilled in the art. Moreover, while working examples of the apparatus and method have been described above, the apparatus and/or method is not limited to the working examples described above, but various design alterations may be carried out without departing from the devices as set forth in the claims.

What is claimed is:

1. A battery cell comprising
  a cell housing and an electrode assembly disposed in the cell housing, the cell housing including
    a first sheet of flexible metal laminate film material bordered by a first peripheral edge having a polygonal shape that defines at least three apexes when seen in top plan view,
    a second sheet of flexible metal laminate film material bordered by a second peripheral edge having the polygonal shape that defines at least three apexes when seen in top plan view,
  wherein
    the first sheet includes
      a first central recess having a polygonal shape that defines at least three first apexes, each first apex having a corner radius, and
      a first flange that extends between the first central recess and the first sheet peripheral edge, the first flange having at least one first alternating ridge and first channel that extends between the first central recess and the first sheet peripheral edge, the at least one first alternating ridge and first channel disposed along the corner radius of each first apex and defining, a curvilinear profile when viewed in cross section, and
    the second sheet includes
      a second central recess having a polygonal shape that defines at least three second apexes, each second apex having a corner radius, and
      a second flange that extends between the second central recess and the second sheet peripheral edge, the second flange having at least one alternating second ridge and second channel that extends between the second central recess and the second sheet peripheral edge, the at least one second alternating ridge and second channel disposed along the corner radius of each second apex and defining a curvilinear profile when viewed in cross section,
    the second sheet is stacked with the first, sheet such that the at least one first alternating ridge and first channel are nested with the at least one alternating second ridge and second channel, and the first sheet is joined to the second sheet along a seal line that extends along the respective peripheral edges and defines a path that is curvilinear in a plane that is parallel to the stacking direction of the first and second sheets,
    the at least one first alternating ridge and first channel having a smaller amplitude and wavelength at the first central recess than at the first sheet peripheral edge, and
    the at least one second alternating ridge and second channel having a smaller amplitude and wavelength at the second central recess than at the second sheet peripheral edge.

2. The battery cell of claim 1, wherein
the first sheet and the second sheet are formed of the same material, the material including an aluminium film layer that is sandwiched between polymer layers,
the central recess of each of the first sheet and the second sheet is formed in a forming process to a depth of greater than 10 millimeters, and
the flange is free of pleats.

3. The battery cell of claim 1, wherein
the first flange surrounds the first central recess, and the first flange has a linear profile in portions of the first flange disposed between adjacent first apexes, and
the second flange surrounds the second central recess, and the second flange has a linear profile in portions of the second flange disposed between adjacent second apexes.

4. The battery cell of claim 1, wherein the first central recess includes a first end surface that is generally parallel to the first flange, and first sides that are perpendicular to the first flange and join the first end surface to the first flange.

5. The device of claim 4, wherein a depth of the first central recess is greater than the draw depth of the first sheet, where the depth of the first central recess corresponds to a distance between the first flange and the first end surface.

* * * * *